United States Patent Office 3,099,977
Patented Aug. 6, 1963

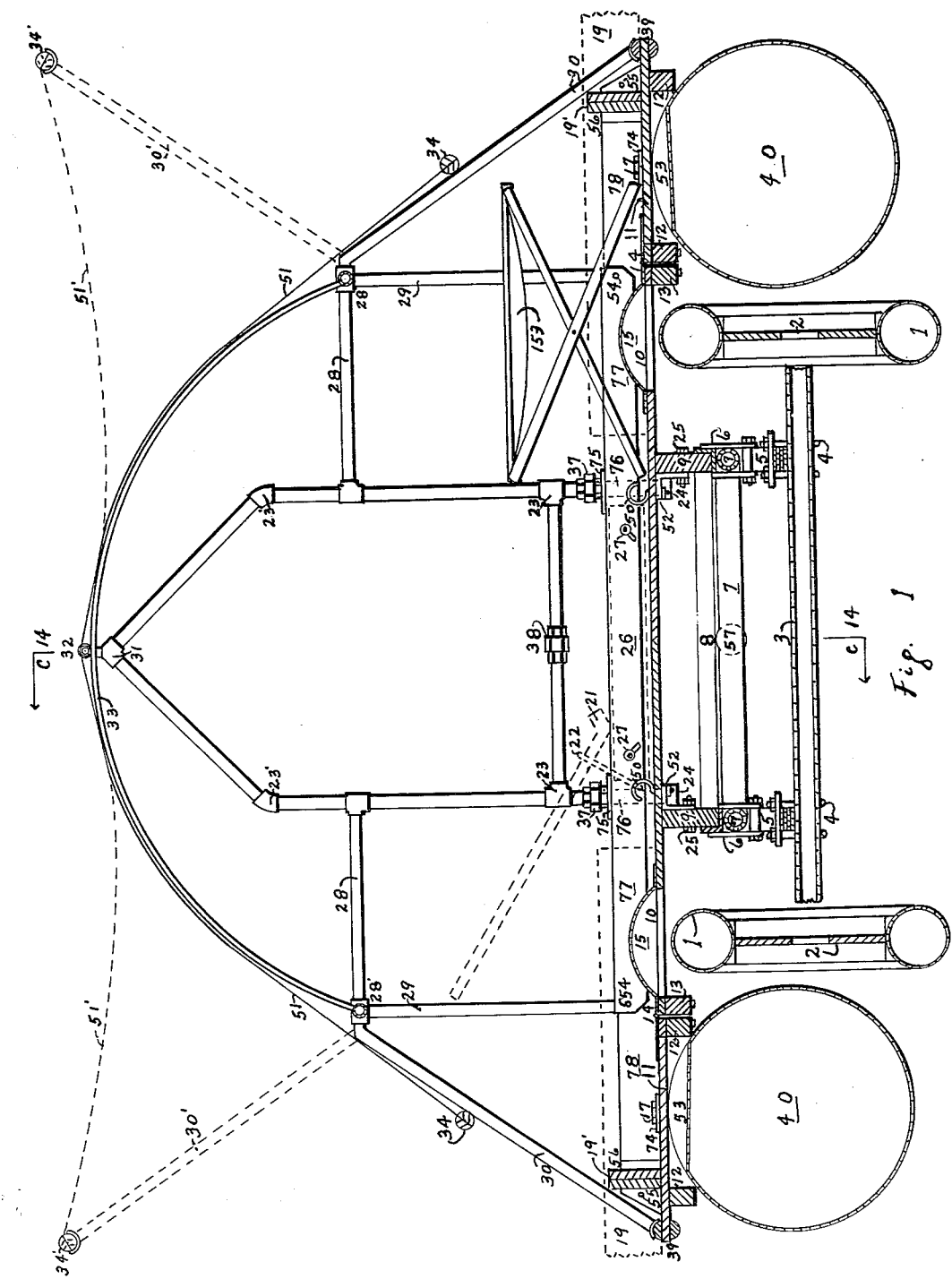

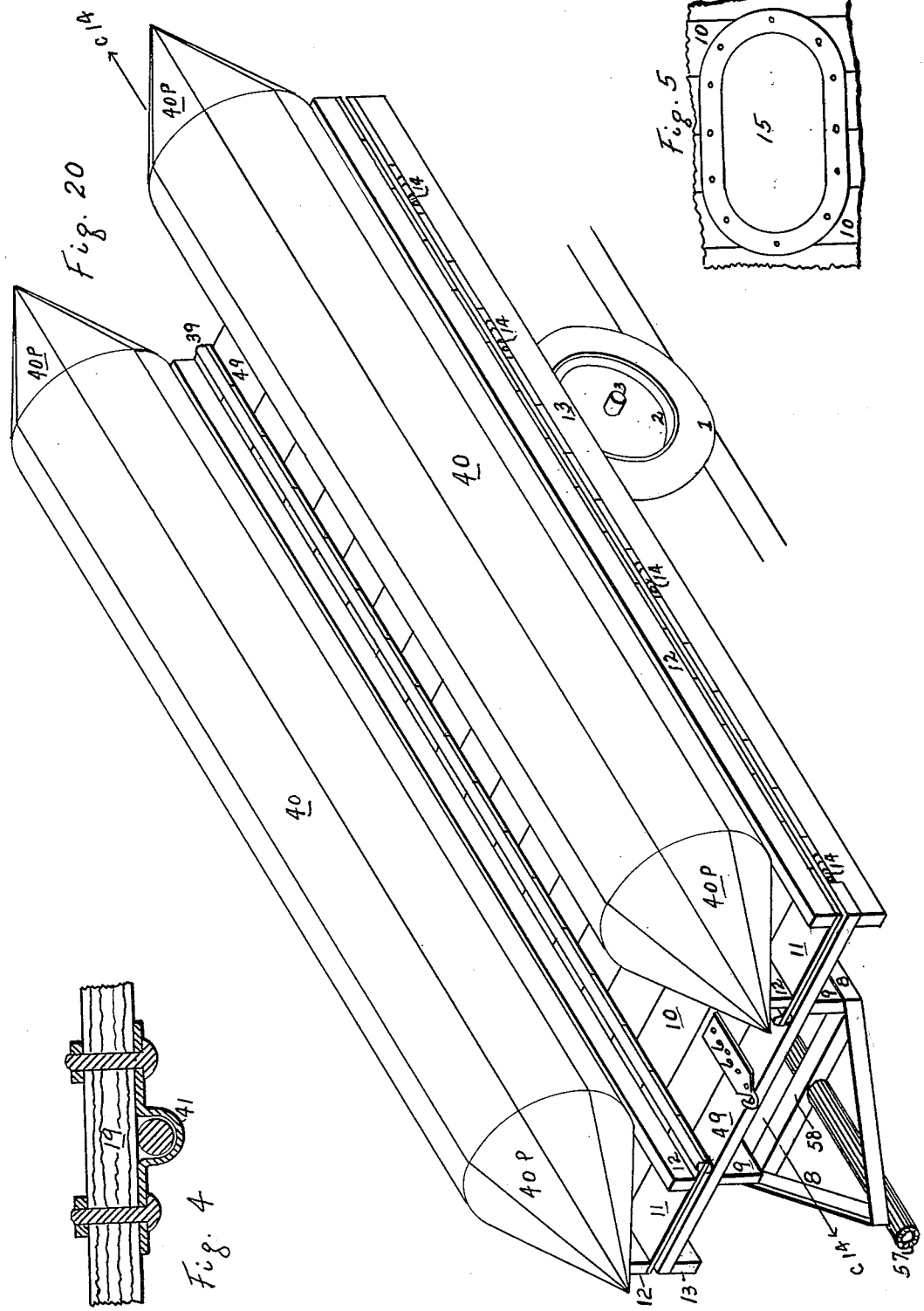

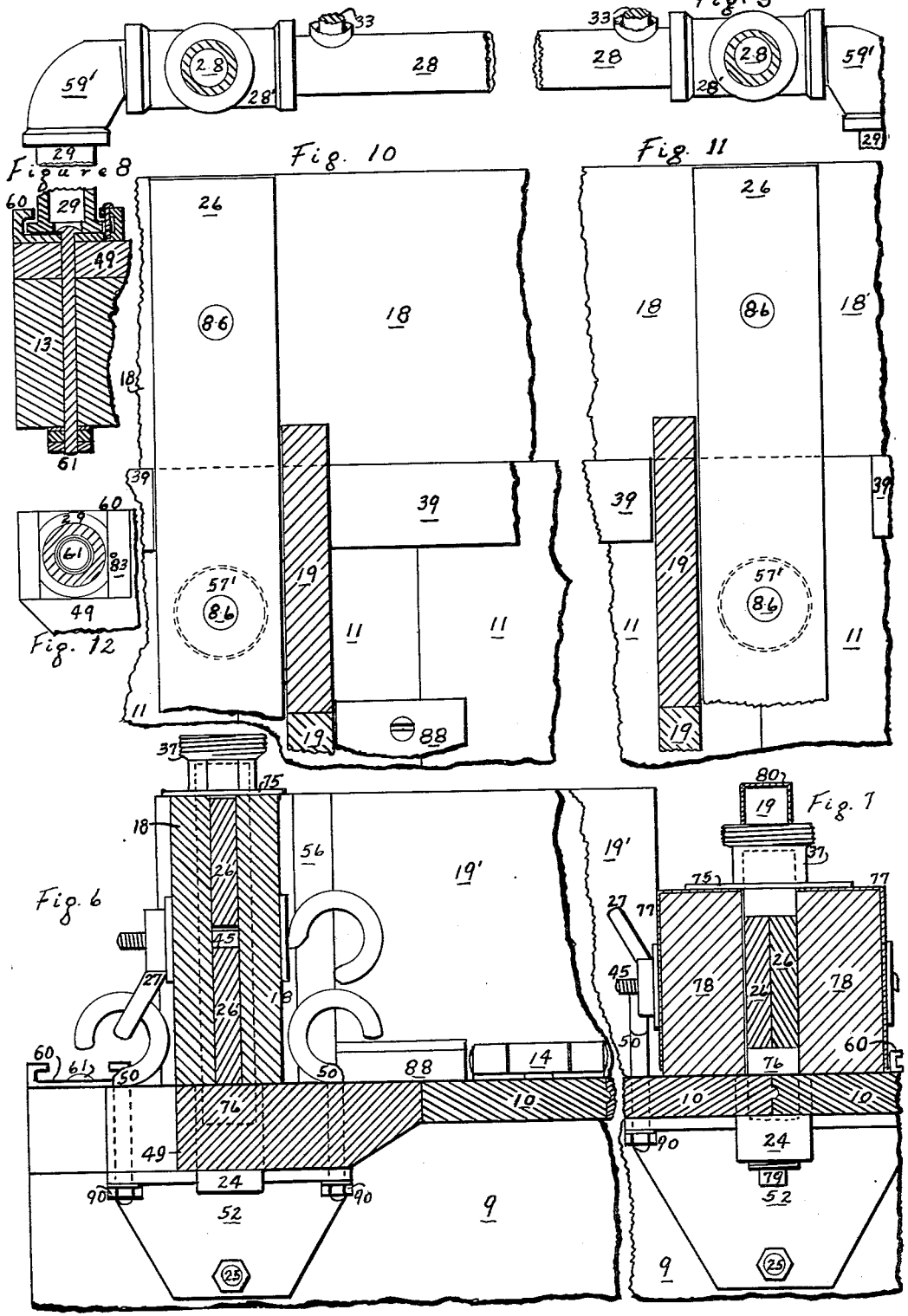

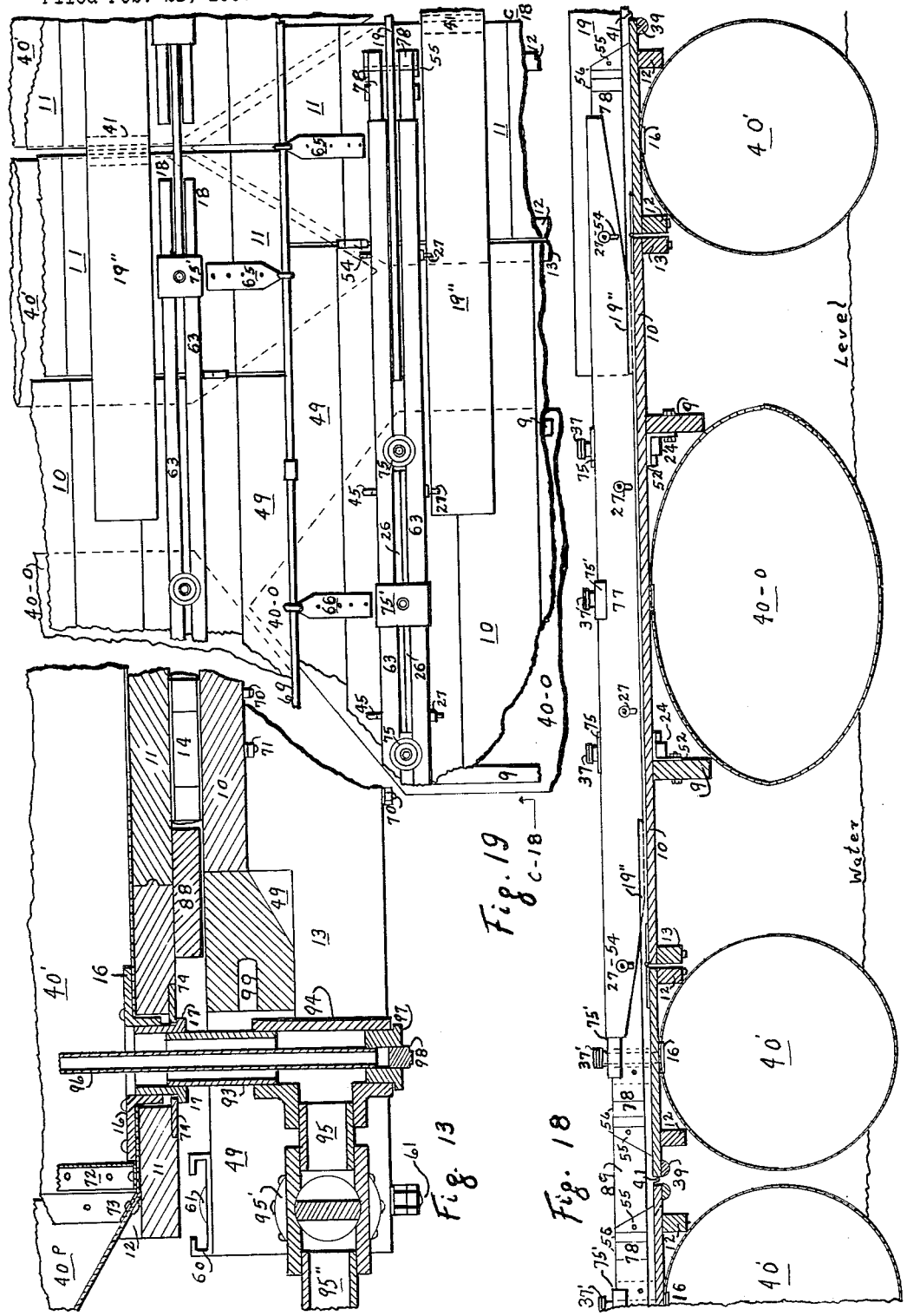

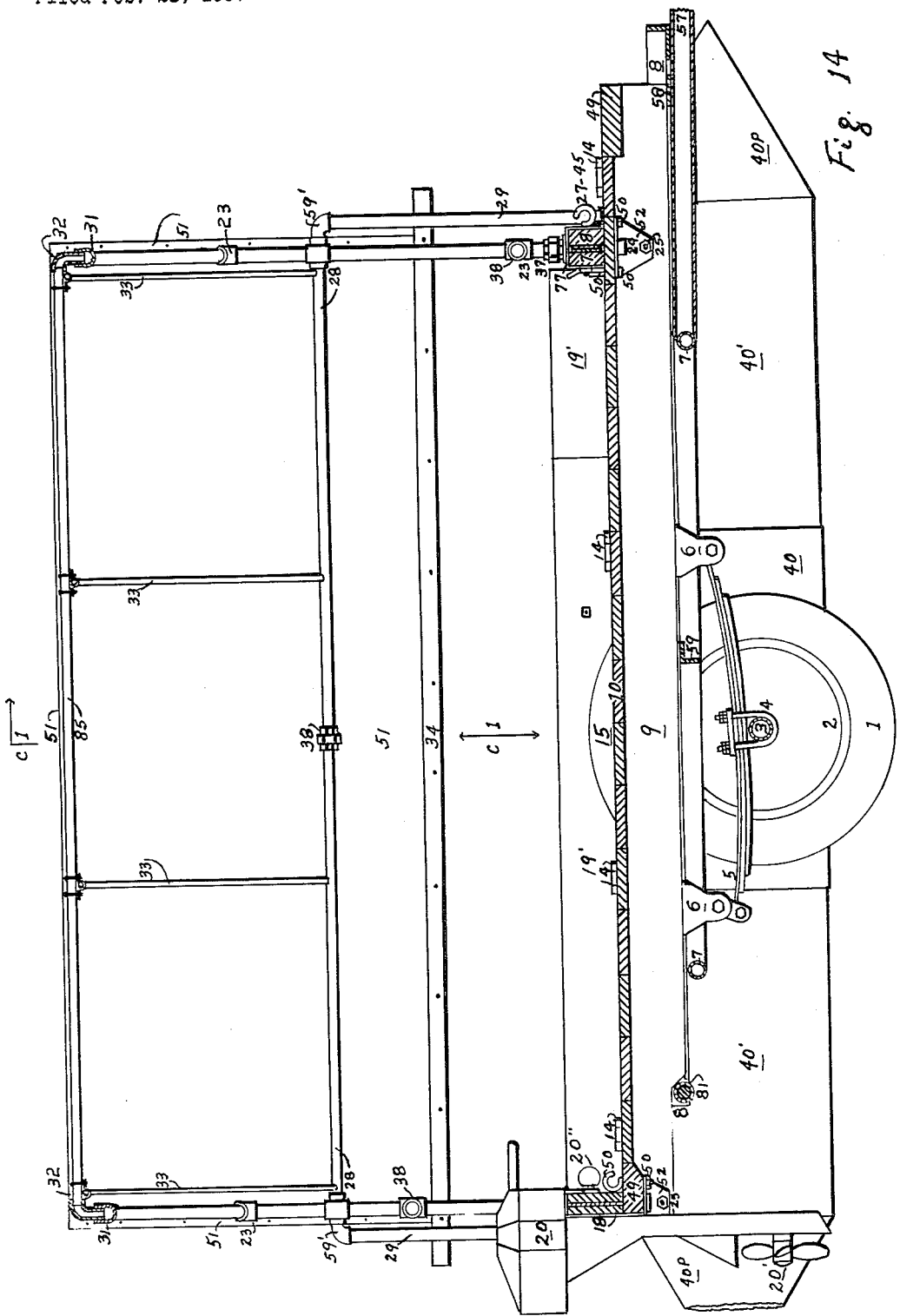

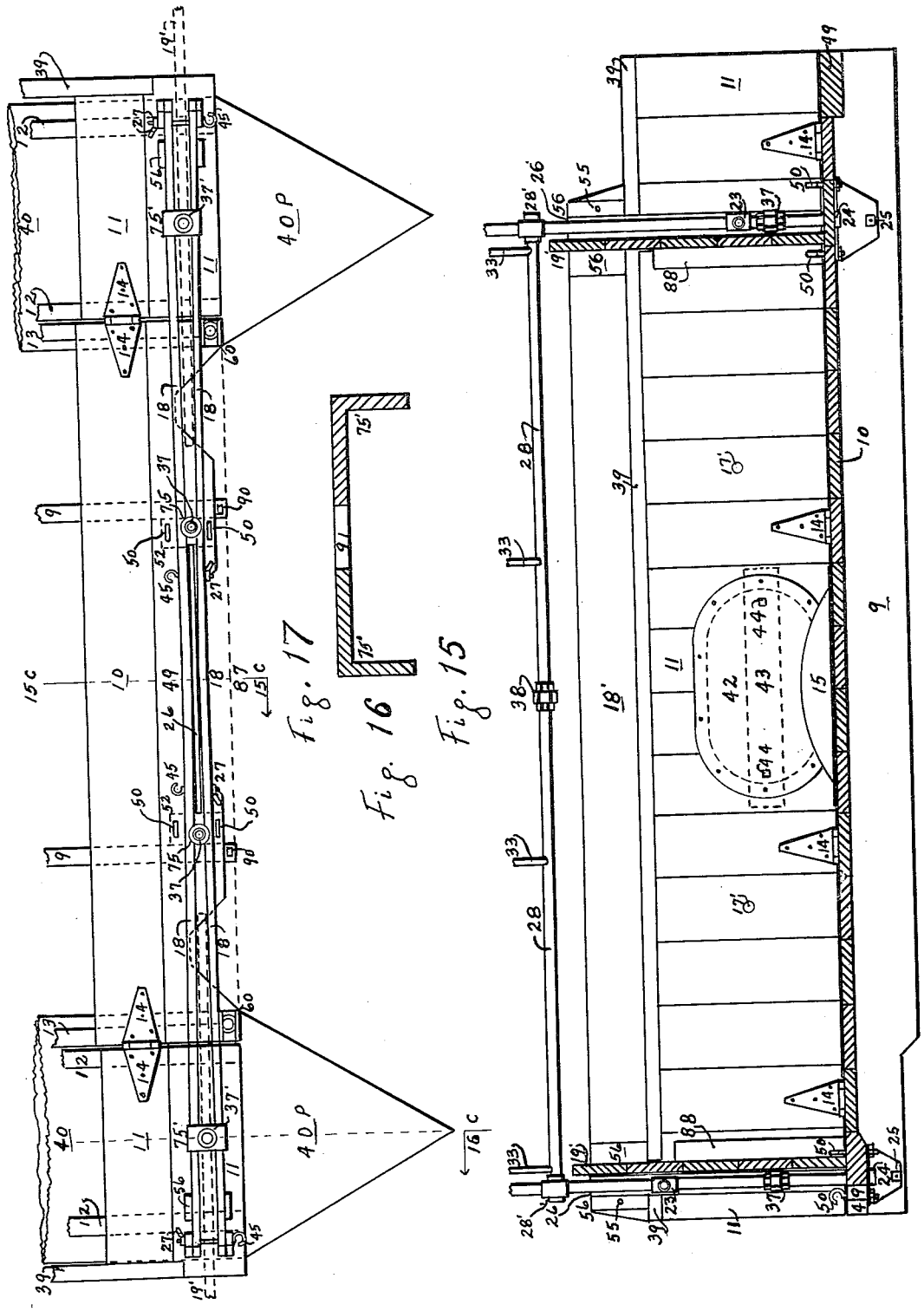

3,099,977
AMPHIBIOUS VEHICLES
Frank W. McLarty, 1603 Tate St., Dallas 8, Tex.
Filed Feb. 21, 1957, Ser. No. 641,729
9 Claims. (Cl. 115—1)

This invention relates to new and useful improvements in amphibious craft.

One object of the invention is to provide a craft that can be folded up on a frame, supported by wheels of conventional spacing, within limits of practicality and of law or highway regulations, and yet that can be folded out and down quickly to form a sort of catamaran which can travel with ease, speed, and stability on water.

Another object is to provide a water traveling craft that can be floated onto the frame of a wheeled vehicle, without the necessity of using a winch or lifting from the water by hand, and then can be transformed easily and quickly into a wheeled land traveling craft that will have clearance for travel at good speed over even rough terrain.

A further object of the invention is to provide a craft of the nature described above that will have little resistance to travel in the water with great maneuverability, and yet that will fold up for travel on land into a shape with little wind resistance and with ability to travel through close places and beneath overhanging limbs, vines, etc.

Further particular objects of the invention are as follows:

(1) To provide craft of the character described above that easily can be assembled and united to form a pontoon bridge, pier, landing dock, barge, etc. capable of carrying large loads whose various units can be replaced to repair injury by shell fire or otherwise without the necessity of altering the other parts or units.

(2) To provide craft for utilization as described in (1) that will require no additional weight for a military unit because such amphibious vehicles will use their decks for carrying tanks or drums or containers for hauling fluids on land and yet can use the same containers as pontoons for supporting the deck, when the craft is on the water.

(3) To provide craft for utilization as described in (1) and (2) that have space on such amphibious vehicles for carrying camping equipment, small arms, etc. to enable a small civilian or military group to have with it everything necessary for maintaining itself.

(4) To provide a frame of a wheeled vehicle that will enjoy the advantages to be derived from an expansion of its parts from springs, mounted on an axle between wheels, to frame sections of greater length and a further expansion to demountable sections of still greater length, which may be supported by cross frame sections to afford a wide deck on buoyant means of sufficient displacement to make the demountable section float with ease and maneuverability on water or to support it in quicksand, mud, etc.

(5) To provide craft of the character described in (4) in which the bed or body members for use on land as a wheeled vehicle can be transformed easily into a frame for supporting the deck on water, with ease of adaptation to each of its amphibious uses.

(6) To provide an amphibious vehicle of the character described that can have the pontoons easily demountable to form an ordinary vehicle on land with a conventional bed or body for hauling merchandise or anything else on highways, over rough terrain, or anywhere that a conventional wheeled vehicle might go, as do army trailers.

(7) To provide a vehicle as described in (6) in which the bed or body can be demounted from the wheel frame easily to form the base or lower section on which to mount a canvas or other covering to form a comfortable hut for soldiers or other campers in any kind of weather.

(8) To provide amphibious craft of the character described in which a hand railing around the deck may serve to reinforce the frame by which the deck is supported on pontoons and to support a frame for a canopy over the deck that also supports the deck.

A primary purpose of the invention is to provide a craft of the catamaran or double hull variety with great speed and maneuverability to which a conventional outboard motor of light weight can be attached, although a modified inboard motor arrangement can be utilized on the deck or individual motors might be utilized in conjunction with each pontoon for very large craft, and although the canopy can be used as a kind of sail, if a rudder be provided.

Other purposes will be more apparent from a description of a construction designed to carry out the invention together with other features of the invention.

The invention will be understood more readily from a reading of the following specification and by reference to the accompanying drawings, wherein an example of the invention is shown, and wherein:

FIG. 1 is a transverse cross section of the craft shown in FIG. 14 looking forward from a vertical plane passing through the axis of the wheel vehicle at the line C1 of FIG. 14.

FIG. 4 is a horizontal cross section through one of the end gate members of the box shown in FIG. 2 at line C4.

FIG. 5 is a plan view of one of the deck wells shown in cross section in FIGS. 1, 2, and 3.

FIG. 6 is a detail vertical longitudinal cross section at line C14 of FIG. 1 of transverse frames, above and near the rear of the central deck, by which the auxiliary decks and pontoons attached thereto may be secured relative to the central deck of the buoyant craft.

FIG. 7 is a detail cross section in the same plane of alternative transverse frames securing the pontoons relative to the central deck as shown at the right or forward portion of FIG. 14.

FIG. 8 is a fragmentary detail cross section of the rear portion of the hand rail, in the longitudinal vertical plane indicated by line C13 in FIG. 3, with the lower part of FIG. 8 cut away to the center line of the pivotally attached vertical member by which the handrail is attached to the corner of the central deck.

FIG. 9 is a fragmentary detail cross section in the same vertical longitudinal plane as FIG. 8 but shows the corner section of the handrail and fragmentarily indicates a means of attachment of that corner section of the handrail to the central deck below in FIG. 7 just as the corner section of the handrail in FIG. 8 would be attached to the rear of the deck shown in FIG. 6.

FIGS. 10 and 11 are fragmentary detail cross sections of rear and front portions of the auxiliary decks and auxiliary sideboards of the box or bed from the same vertical longitudinal plane as FIGS. 8 and 9 and between the handrail of FIGS. 8 and 9 and the central deck shown in FIGS. 6 and 7 below.

FIG. 12 is a fragmentary detail horizontal cross section in a plane between the two segments of FIG. 8 and shows a means whereby the handrail may be attached on election to the central deck contiguous to the four corners of a rectangular rail.

Figure 3:
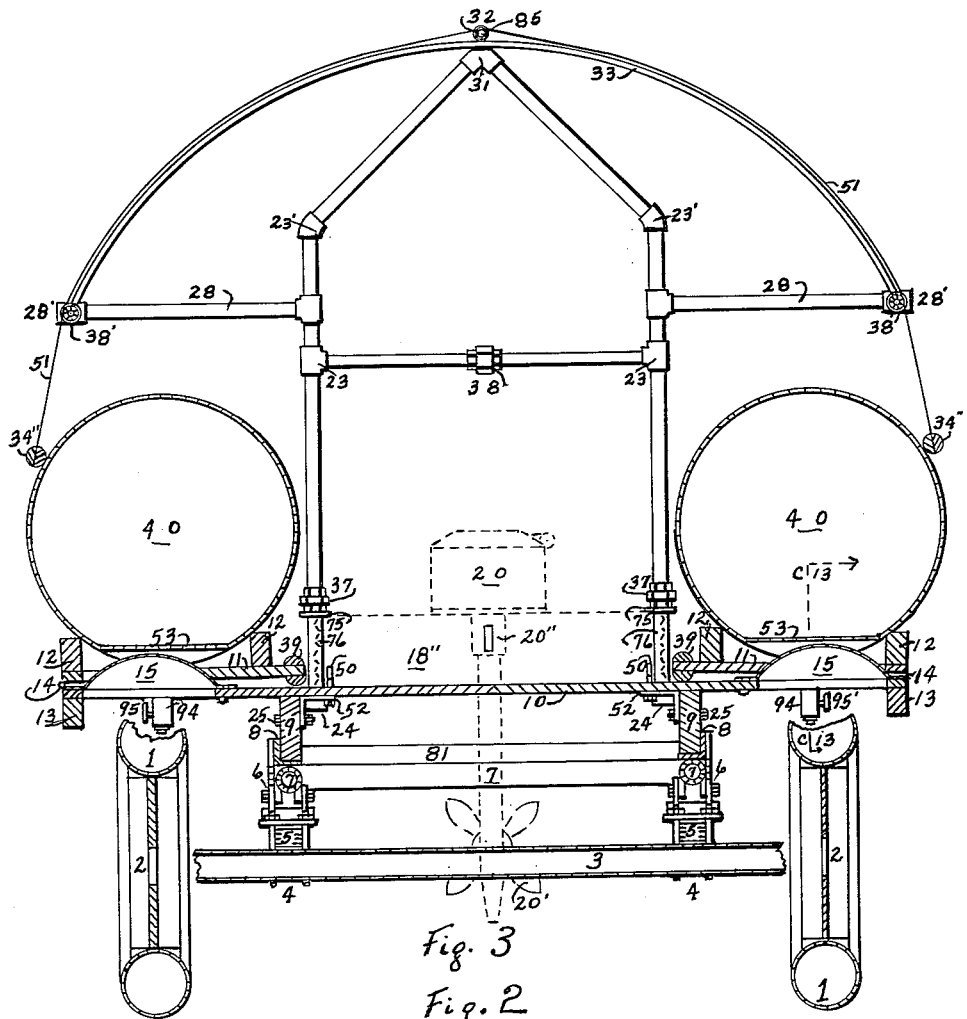
FIG. 3 is a transverse cross section looking rearward from the same plane as in FIGS. 1 and 2 and showing the pontoons hinged up onto the central deck without detachment of the handrail and canopy.

FIG. 13 is a fragmentary cross section in the same vertical longitudinal plane as FIGS. 8, 9, 10, and 11 passing through the centers of the threaded pipe arrangements whereby the pontoons are attached to the auxiliary decks on which those pontoons rest in FIG. 3 as indicated by line C13.

FIG. 14 is a cross sectional view of the craft from a vertical longitudinal plane encompassing the midsectional line C14 shown in FIG. 20 and showing a handrail and canopy mounted on the central deck from which the pontoons have been hinged out and downward to secured positions.

Figure 2:
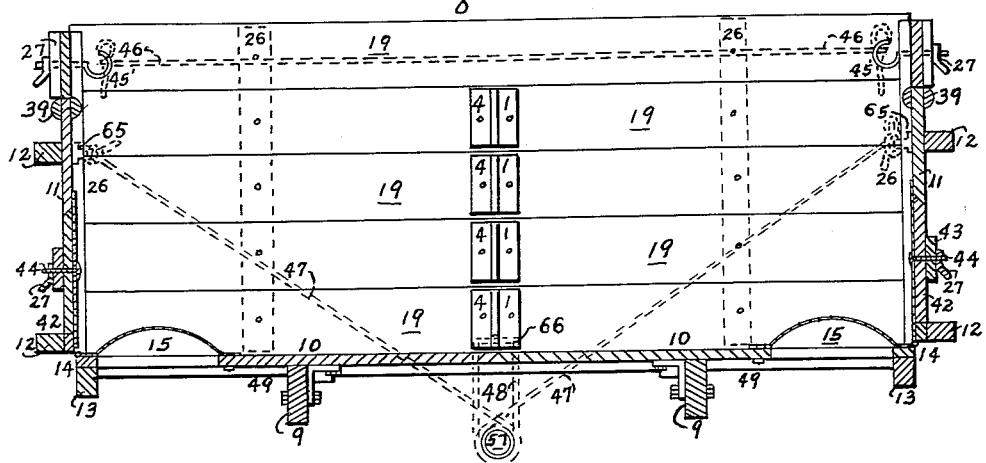
FIG. 2 is a transverse cross section looking forward from the same plane as FIG. 1 and showing an optional box formed by stripping away the pontoons, handrail, and canopy.

FIG. 15 is a vertical longitudinal cross section along the line C14 of FIG. 20 through the midsection of the box shown in FIG. 2 but showing the handrail and canopy in place fragmentarily as shown more completely at a right angle in FIG. 3.

FIG. 16 is a vertical longitudinal cross section through the center, along the line 16C of FIG. 17, of an alternative flanged plate whereby the pontoon is attached to transverse frames extending across the auxiliary deck as well as the central deck.

FIG. 17 is a fragmentary plan view of the rear portion of the buoyant craft from which the handrail and canopy have been detached.

FIG. 18 is a lateral vertical cross section in the same plane as FIG. 1; but the handrail has been removed from the buoyant craft, which has been floated from the framework of the wheeled vehicle, here replaced by an optional pontoon beneath the central deck, with fragmentary means shown attaching the buoyant craft to other such craft at the longitudinal sides thereof.

FIG. 19 is a fragmentary plan view of the forward right corner of the buoyant craft shown in FIG. 18 pivotally attached by means of a horizontal pipe, such as joined segments of the hand rail, to a fragmentary forward section of another such buoyant craft on the opposite side of the horizontal pipe with a third such buoyant craft attached at the side of the second buoyant craft, so that all such craft are attached pivotally on each side of the horizontal pipe to form a somewhat pliant platform hingeable on the horizontal pipe.

FIG. 20 is an oblique perspective view from the front of the primary elements of an embodiment of the invention consisting of a buoyant craft mounted on a wheeled vehicle from which it may be floated readily.

In the drawings, the numerals 1 designate pneumatic tires mounted on wheels 2 to rotate on bearings (not shown) at the ends of a tubular axle 3. U bolts 4 attach the supporting axle 3 to cantilever springs 5, which utilize shackles 6 to support a rectangular frame 7 formed out of tubular units. The spring shackles at the top as well as direct welding rigidly unites this rectangular tubular frame to a longer frame 8 constructed of angle cross section members, which are drawn together at the front, as shown in FIGURE 20, for rigid attachment to a central tubular member 57 for attachment in turn by conventional flexible means (such as a ball and socket joint or a hook and eye attachment now used with military trailers, not shown) to an automobile, tractor, truck, military vehicle etc. Cross members such as the transverse metal bars 58 and 59 preferably having angle perpendicular cross section (FIGURES 14 and 20) serve to give rigidity in addition to other uses to be explained later.

The foregoing constitutes a strong rigid frame for carrying the units on land. But between the vertical guide sections of the frame 8 having angular cross sections and extending out of the rear thereof is another frame of two sections 9 (here contemplated as wooden beams, although metal construction of all these items would be possible), which are relatively light and can be raised with the attaching deck 10 out of the frame 8, which serves as a retainer on land and as a guide for loading the upper craft on the trailer frame from flotation.

Note that the rear ends of the angle frame 8 are held together (FIGURE 14) by a round cross section member on which can revolve a roller 81. By virtue of the fact that a portion of the beams 9 have been notched out (84) at the rear, the roller 81 in conjunction with the drawn-in sections at the front of the angle frame 8 holds the beams 9 against ordinary longitudinal movement on the trailer frame. Of course auxiliary means can be utilized such as fastening the hook 66 (FIGURE 20) with a rope to the tongue 57, as shown by the rope 48 in FIGURE 2.

On reaching water that may be considerably less than one foot in depth (depending on the nearness of the bottom of the pontoons to the lower points of the trailer wheels), it is possible to float the upper section of a vehicle such as that shown in FIGURE 20 off its trailer (or whatever wheeled vehicle is used) without any lifting whatsoever of the frame 9 or the central deck 10. At the edges of the deck 10 are fastened hinges 14, which also are attached by suitable bolts to the edge of the auxiliary or folding decks 11, as indicated by bolts 70 and 71 in FIGURE 13. On reaching the edge of the water, these hinged auxiliary decks 11, to which are suitably attached pontoons 40, can be swung up, outward, and down so that the bottoms of the pontoons will be only a few inches from the bottoms of the wheels on the ground. Note that the beams 12, which give rigidity to the auxiliary decks 11 and support the relatively light weight pontoons while holding them in place (possibly for hauling liquids) in FIGURE 20, become frames by which the entire deck is supported to some extent in the flotation position shown in FIGURE 1. Since the diameter of the drums as here shown is slightly less than the diameter of the trailer wheels, the drums or pontoons may be fastened down into flotation position before pushing the trailer off into the edge of the water. But, if the terrain be rough around the water's edge, the pontoons need not be swung down into flotation position until after the trailer wheels have been pushed out into the water.

In FIGURE 1 is shown a means of forcing the water tight pontoons 40 down into the water so that the beams 9 and central deck 10 will be raised to float out of the angle frame 8. Bolts 25 extend through the beams 9 and through holes in metal angle brackets 52, which can be seen in more detail in FIGURES 6 and 7. Pipe couplings 24 are welded into vertical holes through the horizontal sections of the angle brackets 52. A threaded plug 79 is shown in the lower end of one of these couplings 24 in FIGURE 7. Short sections of ¾ inch pipe 76, as indicated by dotted lines in FIGURES 7 and 6, are threaded from above into the pipe couplings 24, which then lift the central deck sections 49 or 10, when sections of pipe unions 37 are screwed down onto the threads of the short pipe nipples 76 to exert pressure on broad metal washers 75 around the pipes 76 and on top of the beams 18 and 78. It will be understood that in FIGURE 7 the outer edges of the spacing members 26 hide the lines designating one of the two threaded nipples 76 (at each end of 26 in the fore part of the craft) that connect the couplings 24 to the union segments 37. The only problem is in raising the central deck section 10 up to the cross frame members close enough to get the pipe threads started; but this is no particular problem. More accurately it might be said that the problem is one of forcing the pontoons down into the water to make the pipes start their thread connections and to secure sufficient water displacement to float the craft. As indicated in the accompanying drawings, which are to a scale approximately 1/16 actual size for a craft of moderate size, the entire floating structure apart from the trailer would weigh only a few hundred pounds under any circumstances, whereas the total displacement of water by each of the pontoons would be around 2,000 lbs. But it is contemplated that only a few inches of draft in the water would be required to float the foldable craft off the trailer frame 8, out of which it would be free to rise. The frame 8 of course will be at a slight angle to the horizontal, when the wheels are in the water. With such a craft it is possible for a man of ordinary size to step on an outer corner of one of the folding decks 11 and force it down into the water to afford the necessary displacement and to make that corner of the folding deck 11 come into line with the central deck 10, particularly if the wheels of the trailer are only partly submerged, as they ordinarily will be.

In FIGURE 1 the pontoons 40 are held in position against the beams 12 and against the folding decks 11 by flange and nut arrangements 16–17, which are multiple in each pontoon and can be seen in a possible detail (inverted) in FIGURE 13. (FIGURES 6 to 13 are approximately one-half actual size details by comparison with the other figures at 1/16 actual size.) The hexagon nut 17 is a 3/4 to 1 inch pipe bushing, which is screwed into the pipe flange 16 inside the drum or pontoon 40 against a round metal washer 74 to clamp the edges of a hole in the folding deck 11.

Into these 3/4 inch pipe bushings 17 can be screwed short pipes or nipples 93 duplicative of those designated 76 in dotted lines in FIGURES 6 and 7. Astride two bushings 17, which are transversely in line with the pipe couplings 24 in the central deck, can be placed the cross frame members 18 or alternatively the cross frame members 78 near the front of the deck as shown in FIGURE 7. While it will be appreciated that either the pair of cross members designated 18 or the pair designated 78 could be placed at the front or rear, depending on the placement of the shorter or longer nipples 76, it is contemplated that the members 18 shown in FIGURE 6 will be placed at the rear of the craft for in accommodation of an outboard motor and that the cross frames designated 78 in FIGURE 7 will be placed at the fore part of the deck in order that there will be no conflict with vehicles that might want to straddle these members in a manner to be described later. The cross frame members 18 in FIGURE 6, it may be noted, may be the same upper auxiliary side boards that are indicated by 18′ in FIGURE 15, which indicates a longitudinal half segment of an ordinary wagon box.) The auxiliary decks 11 can be hinged or unfolded out and down to the position shown in FIG. 1 either before or after the supporting wheel vehicle is rolled into the water. If the wheel vehicle be rolled out into shallow water before the auxiliary decks 11 and hinged outward onto the water, a man standing on the folding deck 11 then can place a washer 75, such as that shown with side flanges in vertical cross section in FIGURE 16, across the pair of cross frame members (18 or 78) with the 3/4 inch pipe nipples of suitable lengths as indicated in FIGS. 6 and 7 extending upward from the bushings 17 and passing through the holes 91 of the washers. Such washers F16 may be seen in position in FIGURES 18 and 19. He can screw onto each of four short pipe sections (threaded into the pipe bushings 17 and corresponding to the nipples designated 76 shown in FIGURES 6 and 7 by dotted lines) one end segment of a pipe union 37 to draw the hinged deck 11 into line with the central deck 10 by pressure on the four washers 75′ such as shown in FIGURE 16. Having repeated this process at the four corners of the craft, he then can place the four washers 75 as illustrated in FIGURES 6 and 7 over the four pipes 76 extending down into the four couplings 24 and proceed to tighten the pipe union sections 37 down by screwing to give entirely adequate strength and rigidity to the entire single plane deck and to the framework at the rear for attachment of one or more outboard motors, one of which is designated 20 in FIGS. 3 and 14 with the numerals 20′ and 20″ indicating its propeller and hingeable clamp for attachment. The nipples 93 may be as short as those shown in FIGS. 3 and 13, if the unit is to be used only for hauling liquids on land; but, if the pontoons are to be hinged outward for flotation as indicated in FIGS. 1 and 14 the nipples 93 need to be as long as the corresponding nipples 76 shown by broken lines in FIGS. 6 and 7. In this connection, as will be understood later in connection with arrangements for linking buoyant units side by side on water, the end gate boards 19 of FIG. 2, which also are indicated by broken lines in FIG. 1, as well as side boards 18 of FIG. 15 may be of varied width as well as thickness. Such linking boards 19 of FIG. 1 may be notched very slightly at the bottom to accommodate the upward protruding bushings 17; but the protrusion above the auxiliary decks 11 is very slight, when the washers 74 are countersunk therein as indicated in FIG. 13. Slight allowance can be made for any protrusion of the bushings 17 by placement of the holes in the end gate boards 19 to correspond with holes 54 or 55 in the transverse members 18 and 78, not to mention that all these holes can be slightly oversize relative to the horizontal hook-bolts 45 that may complete the linkage in one such arrangement.

Note, however, that the washers 75 do not have overhanging end sections like that shown in FIGURE 16. This is an advantage for removing the cross frame members 18 and 78, when it is desired to fold up the side deck sections without removing the hand rail and canopy frame, to be described later, as shown in FIGURES 3 and 15. This is to permit the insertion of rather long beams 19′ (the end gate board 19 of FIGURE 2) between the end portions of transverse frame members 18 to tie together various units in a more or less rigid manner for purposes to be described later.

While the preceding description of a means of drawing the folding pontoon decks down into the plane of the central deck is entirely adequate for a foldable craft in which a man's weight will submerge one end of a pontoon to a considerable extent, I have shown another means of lifting the central deck of a larger unit in FIG. 1, although any linkage arrangement might be used. In dotted lines is represented a lever 21, such as one of the pipes 30 adapted for use as a hand rail brace and other purposes to be described later. The prize lever 21 is placed on the cross frame members and beneath a rope, chain, or cable 22 connected on each side of the cross frame members 18 or 78 to hook bolts 50, which pass through the central deck 10 (or through a double thickness end member 49, as shown in FIGURE 6) and are attached by means of threaded nuts 90 (FIGURES 6 and 7) to the metal angle brackets 52, in the horizontal sections of which are suitable holes as indicated by dotted lines. A man standing on the folding deck 11 thus can bring about considerable lift (in addition to his own weight) to force the folding deck sections 11 into horizontal with the central deck 10, although a suitable hydraulic jack mechanism in lieu of the prize lever 21 might be desirable for very large foldable craft. Be it noted in this connection that the central deck section of a large unit could be lowered to permit landing of tanks, trucks, etc. directly onto a beach, since the pontoons would pivot or roll slightly on the ground on release of the pipe union sections 37. Multiple units of course would be required to obtain the displacement of a flat bottom craft for that purpose in shallow water.

In FIGURE 1 the lever 21 is shown as resting on the cross frame members 78; but it actually goes down between them somewhat to rest on a spacing member 26, which happens to be one of the end gate straps of the bed or box shown in FIGURE 2. The spacing member 26 is only one-half inch in actual thickness in FIGURE 6, which shows in detail a vertical longitudinal cross section through the center of the rear portion of the central deck 10 and its rear member of extra thickness 49. In FIGURE 6 the cross frame members 18, after tightening down of the pipe unions 37 on the washers 75, have been squeezed together by horizontal hook bolts 45 with suitable metal washers and tail taps 27 turned on the threads T of the hook bolts 45. (The hooks of these bolts also may be used to make secure an outboard motor or to tie up boats, if the foldable craft is used as a landing platform.) This squeezing of the cross frame members 18 serves the double purpose of spreading the ends thereof for easy reception of beams 19 (as shown in FIGURE 17 and as will be explained later in connection with FIGURES 18 and 19) and of reducing the central rear cross frame overall thickness to about two actual inches, as would be required for receiving the mounting brackets of ordinary outboard motors that are expansive to two and one quarter inches.

If the trailer wheels happen to be in very shallow water, and the foldable craft therefore does not have sufficient buoyancy to lift itself out of the angle frame 8 entirely, one of the end gate boards 19 can be used as a prise lever against the front transverse member 58 of the trailer frame 8 (FIGURE 20) and the double thickness center deck member 49 to force the foldable craft out the rear of the angle frame 8 and onto the water. Note again in FIGURE 14 that there is a roller 81 at the end of the angle frame 8 for this purpose in conjunction with the angle at the forward end of the notch 84 in the rear end of the longitudinal frame beam 9. The roller also could aid in loading foldable craft in very shallow water and would make possible the loading of boats, although considerable hand guiding and steadying, some lifting, and a winch might be necessary for loading boats as with conventional trailers.

Unless weighted down into the water, there is some limitation on the vertical diameter of the pontoons 40 because of the limited length of ordinary outboard motor propeller shafts, which, however, sometimes have seven inch extensions as presently marketed. And of course more than one pontoon on each of the folding decks 11 can be provided to give additional lift. But the round 23 inch diameter pontoons shown in the drawings will float more people than can ride in a single automobile without drawing undue water; and yet the weight of the outboard motor and its operator will cause the craft to tilt up at the front for minimizing water resistance to forward movement even at considerable speeds. Yet the rear cross frame beams, to which the outboard motor is attached, will sink sufficiently to keep the propeller blades well under water. Of course the passengers or cargo can be shifted to the rear to some extent for the same purpose; and the outboard motor shaft can be trimmed in the same manner as on a boat of conventional design. Note, however, that with a foldable craft one can go into very shallow water because the propeller will be traveling between the hulls rather than beneath them as would be the case with a boat, at least of conventional hull.

A folding canvas cot 153 is shown on the right of FIGURE 1, and a similar cot can be placed on the left to afford seats for passengers with an alley down the center of the craft, which has ample stability for passengers to walk around with freedom, even though the craft be small. There is sufficient room in the center alley for a table on which to place food, play cards, dress fish, and so forth. And an additional cot can be unfolded in the alley at night.

There can be considerable variation in the shape of the pontoons, but cylinders are the easiest to form in addition to affording maximum strength longitudinally. A number of circular bulkheads, in addition to forming partitions for hauling different liquids at the same time, will maintain the cylindrical shape; and a round cylinder of course can be bent only by crushing it in part. As indicated in FIG. 14, the pontoon 40 is composed of two cylindrical drum segments 40' joined by a unique central cylindrical segment whose ends overlap the adjacent ends of the segments 40', which may be crimped in a conventional manner at the ends for joining with rivets and solder; but I do not wish to be limited by the foregoing as to design or material of construction. For ease of illustration in FIGURE 14 I have shown a central cylinder slightly greater in diameter than the cylindrical drums that form the end portions of the cylindrical assembly; but to minimize resistance to movement in water as floating pontoons it may be desirable to make the central section of the pontoon have the same diameter as the cylindrical end drums, whose wall sections may be crimped inward slightly at the ends of these cylindrical drums for insertion into the central cylindrical member as well as for fitting the other ends of the cylindrical end drums with the somewhat conical end members of the pontoons. It will of course be appreciated that the forward cone tips may be tilted up to some extent just as the rear tips might be tilted downward somewhat. The tips might be rounded or blunted. And the cross sections of the cylindrical sections of the pontoons might have been oval, as some actually were constructed by the applicant. In research I have found pointed conical ends 40P entirely adequate for minimizing water resistance to movement even at considerable speeds; and the same construction permits easy pivoting on the water for great maneuverability. The angle at the base of the cones, where they join the cylindrical sections, can be ironed out into a curve at some expense; but the construction shown in FIGURE 13 seems suitable for anything except very high speeds. In this figure the end of the cylindrical drum 40' is crimped by conventional means to become a short truncated cone 73, after placement of the air-tight bulkhead 72 in the drum 40', to fit into the conical end section 40P of the pontoon 40. The outboard motor propeller shaft, somewhat to the rear of the cross members 18 on which it is mounted, is sufficiently aft to make it churn its water beneath the stabilizing cone, when the motor is turned to the side for making quick turns. It actually is possible to turn in the length of the craft, and this is facilitated by the round cross section of the pontoons. Steering is very easy. The propeller shaft of the outboard motor of course is free to tilt up in the conventional manner, when it rides up on a shallow beach. Not shown are patches on the lower sides of the forward ends of the pontoons for resisting abrasion and injury of rocks on such beaches.

A variety of bed or deck styles may be used within the scope of the present invention; and for purely sporting purposes smaller pontoons may be used with much smaller and lighter wheels. It is not even necessary to have any folding of the deck itself, since pivoting auxiliary frames may be provided otherwise. The design shown in the sketches is for a combination for all uses as far as practicable. The overall height of the pneumatic tires 1 is about the smallest now in use by the armed services; and the pontoons in this design have to be of a depth that will enable them to float in shallow water while the deck composed of members 10 and 49 clears these tires. To minimize the height of the pontoons 40 and the deck, I have shown wheel wells 15 in the central deck 10 to allow for compression of the springs 5 on the road, while the deck 10 barely clears the wheels for sliding back off the trailer in shallow water. The pneumatic tires 1 are spaced according to the width of the ordinary automobile; but it may be noted that there is room 92 between the tires and the trailer frame to have wheels of the "jeep" tread gauge of the armed services. For very heavy loads dual wheels might be used; or the newer flat tread tires for travel on marshes might be used, although the deck wells 15 would have to be altered in any of these instances. Tandem wheels of course could be used for heavy loads, if overall width minimum were sought; but pivoting of the frame on the wheel axle sometimes is advantageous in loading and unloading boats, not to mention horizontal pivoting.

In the pipe unions 37 I have inserted vertical pipe sections on which to build a frame for a canopy 51 in conjunction with a hand rail 28 around the deck 10. The pipe threaded connections 23 that are joined by the horizontal pipe unions 38 are at different heights in FIGURES 1 and 3, it should be noted. In FIGURE 1 the cross pipes and union 38 are low to permit a man's stepping over them at the front of the foldable craft. In FIGURE 3 similar connections and pipes are somewhat higher in order to clear the outboard motor (not shown) to be attached to the cross members 18 at the rear. Note that a man may walk easily beneath the Y connection 31 from which spread the pipes that lead, through 45-degree connections, to the hand rails 28. The latter are joined at the sides by other horizontal pipe unions 38, as shown in FIGURE 14; but it must be understood, although it is not clear in that figure, that these longitudinal pipes are above the beams 13 shown in FIGURE 1. From FIGURE 14 it can be seen that the horizontal handrail sections 28 joined by the unions 38 are threaded at their other ends into "cross" pipe connections, which are shown in FIGURES 1 and 3 as joining the lateral and longitudinal sections of the handrail. Thus the longitudinal handrails in conjunction with the four "crosses" at the corners of the handrail rectangle tend to keep the vertical support pipes arising from the unions 37 in vertical position together with the cross frames 18 and 78. Of course some of the pipes can be welded into their threaded connections, if desired; and structures other than those of tubular cross section may be used, particularly when great strength of the supporting structures is necessary along with ease of disassembly. To the side hand rails are welded fingers for insertion in the ends of small tubular curved bows 3, whose plurality can be noted in FIGURE 14, and whose curvature is shown in FIGURE 1. Such curvature gives maximum strength for supporting the canopy 51, observable in both figures; and the canopy is further supported at the center of foldable craft by a light horizontal tube 85 that also holds the bows 33 in place by suitable brackets as shown in FIGURE 14. This horizontal light tube 85 also is connected to the ¾-inch pipe frame 31 at its ends by suitable elbow connections 32, and the tube 85 thus makes each arch support the others in keeping the lateral arches formed by the canopy frame and by the handrails perpendicular to the deck.

Depending from street elbows 59' inserted in the ends of "cross" pipe connections at the corners of the hand railing 28 (FIGURE 14) are pipes 29 (also seen in FIGURE 1) extending down to the four corners of the central deck section 10. In FIGURES 8 and 12 can be seen the means of attaching the pipes 29 in a bracket 60 at the corner of the end member 49 of the deck 10. Only a very small portion of the forward bracket 60 of a similar nature can be seen in FIGURE 7. End threaded bolts 61 (with carriage heads and suitable nuts) through the beams 13 (FIGURE 8) serve the double purpose of holding the brackets 60 and attaching the beams 13 to the central deck end section 49, which in FIGURE 8 is shown to be notched at the outer end to half its thickness otherwise, in order to receive the top side of the beams 13 in the plane of the lower side of the central deck 10. At the lower ends of the pipes 29 are circular flanges 62, which have holes at the center to accommodate the rounded heads of the bolts 61. After the pipe ends 29 with their flanges 62 are strained into position thus, they will tend to remain in position for strengthening both hand rail and deck; but in FIGURE 12 I have shown a key hole 83 for insertion of a suitable screw pin (shown in FIG. 8) to prevent slippage of the flange 62.

Into the side holes of the four pipe "cross" connections (see two only in FIGURE 1) at the corners of the hand rail 28 are screwed angle bent pipes 30, on the tips of which are curved brackets to fit the half-round beads 39 at the outer edges of the folding decks 11. Since the double cross beams (18 or 78) are strong enough to support the central deck 10 under almost any circumstances, unless it is desired perhaps to use a foldable craft for long ocean voyages, these reinforcing pipes 30 may be turned up 180 degrees in the threads, as indicated by dotted lines, to support the edge poles 36 of the canopy 51. Note that 34 in FIGURE 1 and 35 in FIGURES 1, 3, and 14 indicate only different positions of the edge poles 36 of the canopy 51. When the canopy edge poles are in the 34 and 35 positions, the canopy serves to protect securely against all weather from above and from the sides, depending on the breadth of the canopy. At least it will come down over a box such as that in FIGURE 15. But, when the canopy edge poles are raised to position 36, the canopy is virtually flat, so that there is very little surface to catch the wind, when protection from the sun is the primary purpose. Of course one side of the canopy can be left down to protect against a low sun or to serve as a sort of sail. In the latter case a rudder may need to be provided; but one of the end gate boards 19 may serve that purpose, at least in part. Note that the canopy edge pole 34 comes low enough to protect substantially the folding canvas cot 153 in a position that would permit three such longitudinally disposed cots on the deck. Yet this canopy is open at both ends to obviate resistance of air to forward movement of the craft; and all the canopy can be rolled on the edge poles quickly for stowing away, when fast travel on the highway in good weather is desired.

The preceding arrangement of squeezing the cross frame members (18 or 78) between the hand rail and canopy supporting pipes 76 was shown (FIGURE 17) as a means of keeping the space open between the outer sections of those cross frame members and above the pipe bushings 17 in the folding decks 11, in order to facilitate insertion of end gate boards 19 to unite more or less rigidly two or more foldable craft units to form a barge, bridge, landing pier, etc. Holes 54 or 55 in FIGURE 1 may be utilized for insertion of bolts through the cross frames 18 and the connecting frames 19 as well as through the cross frames 78 and the connecting beams 19 as shown in FIGURE 1 to obviate vertical movement to some extent and shift the burden from one unit to the neighboring ones. If only two holes near the center of each connecting beam 19 and corresponding to the holes 55 through the cross beams 18 and 78 (as illustrated in FIGURE 1) are used in that manner in holding the connecting beam 19 down on the deck, a foldable craft unit can rise up as far as necessary on a wave; but it soon will shift a part of the load to the attached foldable craft unit in sinking down. This is because the holes 55 in cross frames 18 and 78 are so near the edges of the foldable craft decks 11 that even a little clearance between the decks 11 and the connecting beams 19 will permit the edges of the decks to jackknife upward; but the distance between the pivot holes 55 and the ends of the beams 19 will make it impossible for one foldable craft unit to sink below the deck line of the unit adjoining. Be it noted, however, that no attempt has been made to show the second holes in the connecting beams 19, which are shown only in dotted lines in FIGURE 1.

The simplest alternative construction is to have the reinforcing pipe 30 come down at a sharper angle, so that it can be tied into the pipe bushing 17 by means of another short vertical pipe and pipe union. With the latter arrangement, when it is desired to support the canopy edge poles to provide a canopy that is somewhat flat, short tips such as that on the lower end of pipe 30 can be screwed onto the bracing pipe 30, when it is raised by pivoting in the threads of one of the four "cross" pipe connections 28' at the corners of the rectangular handrail.

End gate boards 19 can be placed along the sides of the folding decks 11 in the positions indicated by 19' in FIGURES 1, 6, and 14 to form low railings near the side edges of the expanded deck whose ends will fit into the slots between the guides 56 near the ends of the transverse frame members 18, which otherwise are the auxiliary longitudinal side boards 18 to be seen in FIGURE 15. Short bolts with tail taps 27 through the railings 19' hold the spliced members 19' at proper length, because the holes in the end gate boards 19 have been placed with that in mind. (The holes 55 at the ends of the transverse frame members 18 can be used also in forming a wagon box as indicated in FIGURES 2 and 15.) Thus the end gate boards 19 serve to complete a low railing 19' around almost the entire deck; and any mist that goes over it at any time will drain out readily through the hinge cracks between the decks 10 and 11 and between the beams 12 and 13, although spray will not come up through those cracks. Note that, by way of contrast with a flat bottom boat for approaching a shore, any water that is shipped by a foldable craft in unusally high seas will drain out from the deck. And deck extensions to the sides beyond the crests of the pontoons would keep such shipping of water to a minimum even in extremely high seas, since wave crests would tend to be deflected upward against these extensions by the rounded pontoons. Because these foldable craft as here shown, although they can be folded up to travel on the highways, are almost as broad as they are long, they tend to float as stable as rafts even in very high seas. Winds and waves that would keep ordinary small boats off interior lakes do not bother a foldable craft, which none the less can travel at considerable speed on the water, even though equipped with no more than a five-horsepower outboard motor. In FIGURE 14 it can be seen that the forward deck extends well out over the front conical sections 40P of the pontoons 40; and thus the spray from high speed travel on water goes beneath the deck.

In these drawings all the transverse frame members 18 and 78 are above the deck, so that any waves coming up beneath the deck will not tend to impede the forward movement of the craft; and even the rear double thickness central deck member 49 has been given a sloping forward edge, although it never should touch the water. Since the forward portion of the deck is supposed to rise farther out of the water at all times because of the weight of the outboard motor, operator, etc., it would be possible to have a cross frame member below deck level in that area for extreme strength in such uses as pontoon bridge building, but that strength may be afforded otherwise in the manner presently to be described.

In FIGURES 6 and 7 as well as in FIGURE 14 it can be seen that the forward cross frames 78 are about twice the thickness of the rear cross frames 18. The rear cross frames 18 have adequate strength because of the height necessary for mounting conventional outboard motors; but the height of the forward cross members is limited by the clearance height of automobiles and other wheeled vehicles that may straddle such forward cross members 78, when foldable craft units are joined together to form a bridge as illustrated in another application to be filed in accordance with the restriction requirement mentioned previously. Obviously the cross sectional dimensions of the cross frame members 78 might be increased in both directions, subject only to clearance by the vehicles to traverse such bridges; but in FIGURE 7 I have indicated that angled strips of sheet metal 77 might be utilized to lend increased strength without so much bulk. The same would be true of metal strips 80 (as indicated in FIGURE 7) crimped to cover the connecting beams 19', on which the metal covering would be no handicap for the uses indicated in FIGURE 2 as end gate members 19 of a wagon bed or box.

Similarly crimped metal strips 63 are shown in FIGURE 19, where the width is slightly greater than the projecting ends of the transverse frame members 18 and 78, which may be seen in vertical elevation along with uniting cross frame members 19 and 89 in FIGURE 18. The latter figure is a vertical cross section through the bridge or pier longitudinally at the wheel treads of a vehicle passing over the bridge. The manner in which foldable craft units may be held apart, to avoid friction between the pontoons 40, is indicated in FIGURE 18 by brackets 41, one of which is shown in cross section in FIGURE 4 and also in FIGURE 2 as attached by means of screws, bolts, nails or otherwise to the end gate boards 19. The end gate boards 19 may be held in pivotal alignment, incidentally, by slidable insertion of a rod (not shown in FIGURE 4) through multiple brackets 41 as illustrated in FIGURE 4 for use as an end gate or as a gang plank. While a slidable and pivotal rod may be inserted through two or more of the brackets, when the "end gate boards" 19 are used in a *flattened* horizontal position as illustrated in FIGURE 18 to bridge from the deck of one foldable craft unit to the deck of an adjoining unit, it should be manifest that the "end gate boards" 19 may be used individually to utilize brackets 41 to hold the foldable craft units apart as illustrated in FIGURE 18, since the weight of boards 19 will tend to hold the attached brackets 41 down between the decks 11, although other means may be provided for holding them in place. In FIGURES 18 and 19, where these end gate members 19 (to which the spacing members 41 are attached) are turned down flat on the decks, they have been designated 19".

Such end gate boards 19 also can be utilized as landing ramps or to place between the trailer angle frame members 8 on the transverse frame members 7, 58, and 59 (FIGURE 14) to form a quick platform on which a man can walk out to load a boat from the water onto the trailer. A sportsman sometime will find it convenient to leave the foldable craft on the water for some time as a landing barge, when he can use the trailer for hauling his racing boat etc. after only slight adaptation. Small boats may be anchored safely beneath the deck 10 and between the beams 9, when the foldable craft unit is used as a landing barge that will require little trouble in attaching to the shore or anchoring otherwise; and a foldable craft is sufficiently stable to make a swimming and diving platform that can be moved anywhere—with or without a boat.

The trailers also may be used as rental highway trailer units, when the pontoons are demounted and the side decks are folded up as illustrated in FIGURE 2, where holes (for receiving the wheel wells 15) in the side boards 11 are closed by flanged board units 42, whose outline may be observed by broken lines in FIGURE 15. The metal flanges of the board units 42 may be held in place permanently by screws as indicated in FIGURE 15; but in FIGURE 2 is shown a quickly demountable closure 42 held in place by tail taps 27 on bolts 44 through slats 43 that extend across and somewhat beyond the edges of the holes in the sideboards. The demountable flanged closure 42 may be removed quickly, when pontoons 40 for carrying liquids or for transportation to a body of water are mounted as in FIGURE 3, where the canopy 51 is shown in part as drawn down (by cords not shown) on its frame to where the canopy edge poles at position 35 close against the pontoons 40. Canopy end sections of course can be provided to protect anything carried on the central deck 10 of the trailer shown in FIGURE 3. High speeds of the trailer may cause winds that will require secure means of tying down the canopy, and holes for this purpose are shown in the edges of the canopy 51 in FIGURE 14. When cords from these holes are tied down to the pipe canopy frame, as at the 45 degree connections 23 shown in FIGURE 1 more clearly than in FIGURE 14, they serve to reinforce the entire superstructure and lift the central deck 10, when the craft is floating.

While the applicant has made some effort to show various alternatives that might be of use for special purposes such as those of the armed services, it will be appreciated that all the ordinary sportsman will need in addition to the trailer, decks, and pontoons shown in FIGURE 20 would be the four washers 75, pipe nipples 76, and sections of pipe unions 37 together with four of the cross frame members 18 plus spacers 26 and hook bolts 45 with tail taps 27. The canopy frame shown in FIGURE 3 is highly desirable for the sportsman but is not necessary for the man who wants only to haul liquids etc. It may be detached quickly by loosening the pipe unions 37, although it does not interfere with folding up the pontoons 40. (Note that in FIGURE 3 slight indentations 53 of the pontoons 40 have been made to receive the crests of the wheel wells 15 rather than raise the folding decks 11.) Four end gate boards 19 will complete the closure of the deck in position 20 shown in FIGURE 14; but at least two additional end gate boards 19 should be provided for a gang plank and to serve as oars occasionally. The foldable craft will beach in very shallow water of only a few inches, depending on the load; and one of the gang plank boards 19 can be used as a lever at the front of the center deck to prize the foldable craft afloat from any beach, if other members of the party step to the rear. The foldable craft of course will be completely stable on the beach because of the two hulls, and anchoring is no problem. One need not get his feet wet.

No attempt has been made to show conventional means of connecting the deck boards 49, 10, and 11 to the beams 9, 13, 12 and 39 by bolts, screws, etc. FIGURE 15 is a longitudinal vertical cross section showing the end gates 19 placed between the front and rear vertical pipe supports of the hand rail and canopy frame; but the end gates obviously could be placed nearer the ends of the decks, if it were not for other considerations. As here shown the end gate boards 19 (shown by cross hatching in FIGURE 15, which is a cross section through the center from front to rear) are held in place between wooden stop strips 88 attached at the far side of the deck 10 to the folding decks 11 and similar wooden strips 26 partially hidden from this view by the pipe frame structures rising vertically from the brackets 52. The position of the latter strips, however, may be noted in fragmentary vertical elevation in FIGURE 10, where the guide strip obscured by the vertical pipe in FIGURE 15 is indicated by 26, which it will be recalled also is the number of the end gate strips in FIGURE 2. One means of holding the outside strips 26 in position on the folding deck 11 is shown in FIGURE 10, where 86 is the head of a bolt passing through the strip 26 and the deck 11. About 9 inches from the lower end of strip 26 is another bolt that passes through the center of a larger hole, which otherwise is the means of attaching the pontoon 40 to the deck 11 by insertion of the internally threaded center section of the flange 16 shown above in FIGURE 13. The lower bolt 86 is held in the center of the larger hole in the deck 11 by means of a round wooden spacing washer such as that indicated by dotted lines 57' in FIGURE 10. Note that in FIGURE 10 the fragmentary wooden strip 26 rises above the folding deck-sideboard 11 for receiving an auxiliary sideboard such as 18 in FIGURE 15; and there may be similar strips on the outside of the sideboard 18 as indicated in FIGURE 2. Any means of forming a trailer bed or box may be used so long as it provides for demountable attachment of pontoons to side decks that are hingeably mounted on a central deck. In FIGURE 11, which shows fragmentarily an auxiliary side board 18, a strip 26 covers the hole in the folding deck 11 for attaching the pontoon in the manner previously described. In this fragmentary figure has been left a gap in the half-round border 39 of the folding sideboard-deck 11 of sufficient width to accommodate an end gate 19 either in front of or to the rear of the forward vertical pipe supports of the hand rail and canopy frame. Note, however, that in FIGURE 10 the interior strip 88 is short enough to accommodate the side deck boards 20, when the decks are extended. As can be seen in FIGURE 6 this interior fixed strip 88 varies in width from something slightly less than the thickness of the hinge, as shown also in FIGURE 13, to the approximate thickness of the folding deck border strip 39; and the two decks 11 fold down almost parallel, as shown in FIGURE 3.

Auxiliary fuel for the outboard motor on very long trips could be carried in special containers; or an optional pontoon 40–O could be provided with hand grips for that purpose without causing water resistance. As seen in FIGURE 19, the rear pipe bushing 17 in the deck 10 above the optional pontoon 40–O would be in a convenient place for extracting fuel under slight air pressure or otherwise. But in FIGURE 13 I have shown a more convenient means of extracting fuel from one of the pipe bushings 17 at the rear of the pontoons 40, in which some fuel may be loaded in a rear section while the pontoon 40 is folded up for the highway and then may be tumbled off into floating position on reaching the water, obviating direct lifting of the loaded fuel container. A pipe nipple 93 is threaded at one end into the rear bushing 17 (one of multiple retainers for each of the pontoons 40); and on the opposite end is threaded a T pipe connection 94, whose opposite end has a threaded plug 97 with a hole for receiving a smaller threaded pipe 96 and a smaller threaded plug 98. Fuel can be injected into the drum 40 through the pipe 95 (threaded into the T connection 94), to which a suitable hose may be attached. Removal of the small plug 98 will permit the escape of air through the small tube 96, which extends almost to the opposite side of the drum 40 shown here in only fragmentary cross section. After the pontoon has been inverted by tumbling it off the trailer into the water, the pipe 95 may be capped; but the cap should have a small air hole to permit flow of fuel through the small pipe 96 to the outboard motor primary tank. Note that this arrangement is suitable for hauling fuels, water, spray materials, et cetera on the highways in the rear compartments of the pontoons or drums, although a more fixed arrangement with small holes (not shown) through the deck 10 may be used for hauling liquids in the other compartments. Spigots (not shown) would be attached to short ¾ inch nipples inserted through these deck holes for hauling liquids in the forward compartments. Only unscrewing of the spigots would be necessary to transform a liquid hauling trailer into an amphibious craft. But at the rear it is possible to have recesses in the section 49 for accommodating the pipe connections 93, 94, etc. as may be seen in FIGURE 17; and the tilt of the foldable craft to the rear in the water will make the fuel drain toward the tip of the small tube 96.

A dotted line at the rear in FIGURE 17 indicates how the section 87 sawed out of the central deck member 49 may be reinserted, when the pontoons are not attached. Nuts 90 on bolts near the rear tips of the beams 9 indicate a means of holding the removable section 87 of deck member 49 in place; and dowels may be provided for insertion in dowel holes such as 99 in 49 of FIGURE 13. This might be only for conforming to conventional ideas of beauty etc. And, if the end gate be placed at the extreme rear instead of as shown in FIGURE 15, it may be desirable to reinforce the rear floor with one of the right angle metal reinforcements 77 of the cross frame members 78 as shown in FIGURE 7. Note in FIGURE 1 that the hole 54 for receiving a horizontal hook bolt 45 is in a metal reinforcement that is just the right length for reinforcing the rear floor cracks, although similar metal reinforcing members 63 in FIGURES 18 and 19 are somewhat longer. Slight recesses for the hinges in the cross frame members 78 would make them adaptable for breaking the hinge cracks at the sides of the deck 10; but this would not be necessary for most purposes, and the box is relatively tight without any of these as shown in FIGURE 15.

Ropes 46, 47, and 48 in FIGURE 2 are shown as a means of holding the sides of the trailer bed or box in position, but other conventional means may be used. The ropes or small chains or cables simply are useful otherwise for anchoring et cetera.

While, as indicated previously, the front end gate might have been placed farther forward than is indicated in FIGURE 15, the arrangement shown offers the advantage (in addition to strength for bridges etc.) that a platform is afforded in front of the trailer box or bed from which to load and unload things into the trailer over the end gate. It also makes a good platform free of canopy obstructions for casting by a fisherman. And it is an excellent place to crouch close to the water, when running a trot line. Note that a foldable craft will float easily in any direction for this purpose and that there is no danger in standing right on the edge of the craft, which cannot be capsized. Of course by raising the canopy a fisherman can cast from the sides of the craft over the hand rails; or he can stand on the outside and lean back against the rails, which are almost two feet from the edge.

In FIGURE 17 it can be seen that the rear extensions of the main beams 9 can be used for attachment of cables beneath them; and similar means for attachment to the forward ends of those beams can be provided, so that a crane very easily can unload a foldable craft from a ship to travel ashore under its own power. Of course from a Landing Ship Tank it would be possible to roll a foldable craft right down the ramp in the usual manner, and the wheels could be loaded on immediately, if desired. For short distances in a landing operation the pontoons can carry the wheels as shown in FIGURE 1, if the angle frame 8 be tied to the main beams 9; otherwise the trailer can be loaded for faster movement over a greater distance. Instead of loading trucks on a combination of foldable craft as indicated in FIGURE 19, they could be loaded lengthwise on larger foldable craft.

One of the outstanding features of the foldable craft as shown in the attached figures is the extraordinary longitudinal strength with a minimum of weight imparted by the cylindrical pontoons, which in turn are reinforced by the longitudinal beams. But the greatest advantage is in having a portable craft that is completely safe. It cannot be capsized on the surface of the water; and it is almost literally true of the craft shown in FIGURE 20 that "everything floats but the hinges."

What I claim and desire to secure by Letters Patent is:

1. A buoyant craft comprising a substantially rectangular and rather pliant *single* deck, parallel pontoons horizontally spaced from each other and hingedly attached by horizontal pivots to the said deck parallel to the sides thereof, multiple transverse frames above the deck each of whose ends extend at least substantially from points directly above the longitudinal axis of one pontoon to points directly above the longitudinal axis of the other pontoon, the rear such transverse frame preferably being a horizontal beam turned up on edge, near the rear end of the deck, on which may be mounted a detachable outboard motor for propelling the craft on water, multiple longitudinal frames beneath the deck and extending at least substantially from the front to the rear of said deck, and suitable means in the midportion of deck whereby the transverse frames are held substantially against the upper surface of the deck and the longitudinal frames are held against the lower surface of the deck, a suitable means for holding such frames against the deck being the equivalent of metallic angle frames bolted and screwed through holes therein to the deck and to the transverse and longitudinal frames above and below the deck.

2. A buoyant craft specified in claim 1 in which said longitudinal runner frames serve as aligning guides for an auxiliary pontoon of less depth than the other two that may be attached by threaded means to the midsection line of the craft, the said auxiliary optional pontoon being short enough not to come in conflict with the propeller shaft of the outboard motor at the rear of the deck.

3. A buoyant craft specified in claim 1 in which the deck has a handrail at suitable height above and substantially around its borders wherein the *side* sections of the hand rail will clear the pontoons when these are swung pivotally upward and inward to lie on the side portions of the deck, means of attaching the handrail to the midsection of the deck at four points between the pontoons, and easily detachable means pivotally attached to the handrail at its corners maintaining the position of the deck relative to the pontoons, after the pontoons are swung pivotally outward and downward to their flotation position.

4. A buoyant craft specified in claim 3 in which the side segments of the handrails have attached thereto the bases of multiple arched members which not only reinforce the handrails in maintaining the position of the pontoons relative to the deck but serve as supports of a canopy whose side edges are attached to poles that may be drawn down on the arch and may at other times be supported by said easily detachable means pivotally attached at the corners of the handrail thereby making the canopy almost flat.

5. An amphibious craft comprising a buoyant craft component, as specified in claim 1, wherein a land vehicle component conveying the said buoyant craft consists of wheels suitably and resiliently mounted beneath a chassis, supporting multiple longitudinal and substantially parallel horizontal frames attached to the chassis beneath the longitudinal frames supporting the deck of the buoyant craft, and suitable continuous longitudinal and substantially horizontally disposed guides keeping the longitudinal frames of the deck in alignment with the chassis, the guides being open at the top and thus permitting the buoyant craft to be floated on and off the vehicle under suitable circumstances of water displacement by the pontoons with suitable easily detachable means of suspending the wheel vehicle chassis beneath the buoyant craft such as by ropes binding tips of the horizontal longitudinal frames beneath the deck of the buoyant craft to the horizontal longitudinal frames carried above the chassis under other unusual circumstances.

6. An amphibious craft specified in claim 5 in which the pontoons have apertures with suitable connecting pipes and faucets spigots so located that liquids can be drained completely by gravity from compartments of the pontoons, when the pontoons are swung up onto the deck, and can be pumped from the same apertures of the pontoons above the water line, when the pontoons are afloat.

7. An amphibious craft specified in claim 5 in which the pontoons are attached by suitable threaded means to auxiliary decks, the auxiliary decks having longitudinal beams beneath them that align the pontoons relative to the longitudinal midsection line thereof and serve as supports therefor on land, and the auxiliary decks also serving as side walls, pivotally mounted on horizontal axes, of a box or bed on the highway as well as of a tent on the ground upon detachment of the pontoons therefrom, a suitable threaded means for attachment of the pontoon to the auxiliary deck consisting of a pipe flange riveted and soldered to the pontoon wall around an aperture in the pontoon mid- the pontoon wall around an aperture in the pontoon midway between longitudinal frames attached to the auxiliary deck and coming in contact with the walls of the pontoon at equally spaced intervals from the aperture, the internally threaded annular tip of the flange being inserted loosely in a hole in the auxiliary deck midway between its attached longitudinal frames, an annular flat washer surrounding the hole in the auxiliary deck on the opposite side thereof, and a pipe bushing having polygon wrench tips that press against the washer over its inner rim, when the bushing is screwed into the annular tip of the pipe flange.

8. An amphibious craft specified in claim 7 in which auxiliary longitudinal segments such as auxiliary upper side boards of the box or bed on the highway supplementing the hinged auxiliary decks are usable as transverse frames above the decks and pontoons on water for supporting the main deck between the pontoons and as transverse frames for joining such buoyant craft units side by side on water.

9. A buoyant craft comprising a substantially rectangular deck to the sides of which are hingedly attached parallel pontoons, longitudinal beams attached to the lower side of the deck, multiple transverse frames above the deck and pontoons with means of suspending the longitudinal beams from the transverse frames, such as multiple vertical linkages each of which is composed of an angular metal bracket whose vertical segment is bolted through corresponding holes to a longitudinal beam beneath the deck and whose horizontal segment is welded to an internally threaded pipe coupling, extending upward through a snugly fitting hole in the deck, into the upper end of which is screwed a pipe section threaded at both ends and extending upward from the coupling, between two transverse beams above the deck, placed on edge and suitably spaced for closely receiving the pipe between them, through a slidably mounted metal washer that spans the tops of the two spaced transverse beams and is held in desired position vertically relative to the pipe, to the deck, and to the transverse beams by a suitable means detachably connected to the pipe, and auxiliary means of suspending the longitudinal beams from the transverse frames at *variable* heights with suitable power application thereto, thereby permitting the deck to be raised and lowered relative to the pontoons, said auxiliary means being the equivalent of multiple angle-cross-section brackets beneath the deck whose vertical segments are bolted through corresponding holes to the longitudinal frames and whose horizontal segments have vertical holes retaining with threaded nuts the lower threaded ends of hook-bolts inserted through snug holes in the deck adjacent a pair of suitably spaced transverse beams horizontally bolted to each other and extending, with possible splicing, at least from the crest of one pontoon to the crest of the other pontoon, a tension linkage such as a chain forming a slack loop from the hook of one of the hook-bolts to the hook of its paired hook-bolt attached to the same angle bracket with the loop linkage having sufficient slack therein to pass over the paired and bolted transverse beams with sufficient clearance to insert a suitable jack on said pair of transverse beams and under the loop of the linkage, by which the multiple jacks, to which power may be applied and released for raising and lowering the crests of the jacks, under the several chain loops control the height at which the deck is sustained relative to the pontoons and thereby to the land, if the pontoons are resting on a beach.

References Cited in the file of this patent

UNITED STATES PATENTS

| | | |
|---|---|---|
| 1,283,766 | Hill | Nov. 5, 1918 |
| 2,085,156 | Hill | June 29, 1937 |
| 2,321,677 | Higgins | June 15, 1943 |
| 2,341,166 | Todd | Feb. 8, 1944 |
| 2,588,084 | Bushfield | Mar. 4, 1952 |
| 2,644,176 | Livermon | July 7, 1953 |
| 2,704,989 | Konecy | Mar. 29, 1955 |
| 2,745,118 | Potts et al. | May 15, 1956 |
| 2,759,201 | McKinney | Aug. 21, 1956 |
| 2,846,262 | Ray | Aug. 5, 1958 |
| 2,850,747 | Bouchard | Sept. 9, 1958 |